(12) United States Patent
Bayha et al.

(10) Patent No.: US 9,792,594 B1
(45) Date of Patent: Oct. 17, 2017

(54) AUGMENTED REALITY SECURITY APPLICATIONS

(71) Applicant: Wells Fargo Bank, N.A., San Francisco, CA (US)

(72) Inventors: Harlen Bayha, San Diego, CA (US); Kourtney Eidam, Marietta, GA (US); Richard Harrison Luttrell, Jr., Huntersville, NC (US); Dominik Vltavsky, Belmont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 14/151,974

(22) Filed: Jan. 10, 2014

(51) Int. Cl.
| | |
|---|---|
| *G06Q 20/10* | (2012.01) |
| *G06T 19/00* | (2011.01) |
| *G02B 27/01* | (2006.01) |
| *G06K 9/00* | (2006.01) |
| *G06Q 20/32* | (2012.01) |
| *G06Q 20/40* | (2012.01) |

(52) U.S. Cl.
CPC ....... *G06Q 20/1085* (2013.01); *G02B 27/017* (2013.01); *G06K 9/00885* (2013.01); *G06Q 20/32* (2013.01); *G06Q 20/40145* (2013.01); *G06T 19/006* (2013.01)

(58) Field of Classification Search
USPC ......................................................... 705/43
See application file for complete search history.

(56) References Cited

U.S. PATENT DOCUMENTS

| | | | |
|---|---|---|---|
| 5,832,296 A | 11/1998 | Wang et al. | |
| 7,634,662 B2 | 12/2009 | Monroe | |
| 7,653,600 B2 | 1/2010 | Gustin et al. | |
| 7,822,684 B2 | 10/2010 | Rielly et al. | |
| 7,890,433 B2 | 2/2011 | Singhal | |
| 7,980,462 B1 | 7/2011 | Graef et al. | |
| 8,033,453 B2 | 10/2011 | Scanlon | |
| 8,070,055 B2 | 12/2011 | Block et al. | |
| 8,090,159 B2 | 1/2012 | Gabara | |
| 8,244,002 B2 | 8/2012 | Chen et al. | |

(Continued)

FOREIGN PATENT DOCUMENTS

GB 2461975 A 1/2010

OTHER PUBLICATIONS

Yayla et al., "An Exploration of Using Face Recognition Technologies for National Security," http://www.pa.edu.tr/APP_DOCUMENTS/D478B2AD-3813-4555-9629-6332F8CF8D33/cms_statik/_dergi/2004/1-2/141-158.pdf 2004, 18 pages.

(Continued)

*Primary Examiner* — Kito R Robinson
*Assistant Examiner* — Shacole Tibljas
(74) *Attorney, Agent, or Firm* — Merchant & Gould P.C.

(57) ABSTRACT

A method implemented on an augmented reality electronic device includes an augmented reality electronic device. A wireless connection is established between the augmented reality device and an automated teller machine (ATM). A user of the augmented reality electronic device is authenticated. After the wireless connection is established and after the user is authenticated, a financial transaction is initiated. Financial information is received from the ATM related to the financial transaction. The financial information is displayed on a display screen of the augmented reality electronic device.

11 Claims, 9 Drawing Sheets

(56) References Cited

U.S. PATENT DOCUMENTS

| | | |
|---|---|---|
| 8,245,915 B1 | 8/2012 | Ramachandran et al. |
| 8,332,320 B2 | 12/2012 | Singh |
| 8,370,639 B2 | 2/2013 | Azar et al. |
| 8,438,110 B2 | 5/2013 | Calman et al. |
| 8,632,000 B2 | 1/2014 | Laracey |
| 8,881,977 B1 | 11/2014 | Paczkowski et al. |
| 9,004,353 B1* | 4/2015 | Block ................ G06Q 20/1085 235/379 |
| 9,038,894 B2 | 5/2015 | Khalid |
| 9,087,428 B1 | 7/2015 | Velline et al. |
| 9,218,361 B2 | 12/2015 | Cardonha et al. |
| 9,384,477 B2 | 7/2016 | Johnson et al. |
| 9,413,534 B2 | 8/2016 | Pieczul et al. |
| 9,418,358 B2 | 8/2016 | Johnson et al. |
| 2005/0215238 A1* | 9/2005 | Macaluso ............. G06Q 30/02 455/414.1 |
| 2011/0150296 A1 | 6/2011 | Eckhoff et al. |
| 2011/0238573 A1 | 9/2011 | Varadarajan |
| 2011/0320294 A1 | 12/2011 | Votaw et al. |
| 2012/0197797 A1* | 8/2012 | Grigg ................. G06Q 20/1085 705/43 |
| 2012/0197798 A1 | 8/2012 | Grigg et al. |
| 2012/0212414 A1 | 8/2012 | Osterhout et al. |
| 2012/0231424 A1 | 9/2012 | Calman et al. |
| 2012/0231814 A1 | 9/2012 | Calman et al. |
| 2012/0232937 A1 | 9/2012 | Calman et al. |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |
| 2012/0233015 A1 | 9/2012 | Calman et al. |
| 2012/0233032 A1 | 9/2012 | Calman et al. |
| 2012/0233072 A1* | 9/2012 | Calman ................. G06Q 40/02 705/44 |
| 2012/0265679 A1 | 10/2012 | Calman et al. |
| 2013/0033522 A1 | 2/2013 | Calman et al. |
| 2013/0057585 A1 | 3/2013 | Ahmad Athsani et al. |
| 2013/0124411 A1 | 5/2013 | Kobres et al. |
| 2014/0115492 A1 | 4/2014 | Tehranchi et al. |
| 2014/0164244 A1 | 6/2014 | Wilson |
| 2014/0210621 A1 | 7/2014 | Argue et al. |
| 2014/0347265 A1 | 11/2014 | Aimone et al. |
| 2015/0058216 A1 | 2/2015 | Luciani |
| 2015/0127714 A1 | 5/2015 | Ivashyn |
| 2015/0134430 A1 | 5/2015 | Ellis et al. |
| 2015/0154598 A1* | 6/2015 | Forte ...................... G06F 21/83 380/28 |
| 2015/0221151 A1 | 8/2015 | Bacco et al. |
| 2015/0287018 A1 | 10/2015 | Iqbal et al. |
| 2016/0037137 A1 | 2/2016 | Seiflein |
| 2016/0132754 A1 | 5/2016 | Akhbardeh et al. |
| 2016/0162869 A1 | 6/2016 | Gupta et al. |

OTHER PUBLICATIONS

Elash et al., "Canadian casinos, banks, police use facial-recognition technology," http://www.theglobeandmail.com/news/national/time-to-lead/canadian-casinos-banks-police-use-facial-recognition-technology/article590998/, 2012, 2 pages.

Mok et al., "Addressing Biometrics Security and Privacy Related Challenges in China," http://pact.vitamib.com/documents-1/news-documents/Paper_16_IEEE_web_version.pdf, 2012, 8 pages.

Diebold, "Diebold Deploys First ATM Without Card Reader or PIN Pad," http://news.dieboldnixdorf.com/press-releases/diebold-deploys-first-atm-without-card-reader-or-pin-pad.htm, Mar. 20, 2014, 2 pages.

Seifert et al., "Don't Queue Up! User Attitudes Towards Mobile Interactions with Public Terminals," https://www.researchgate.net/publication/237006908_Don't_queue_up_User_attitudes_towards_mobile_interactions_with_public_terminals, Dec. 3, 2012, 4 pages.

Claycomb et al., "Secure Real World Interaction Using Mobile Devices," http://citeseerx.ist.psu.edu/viewdoc/summary?doi=10.1.1.93.9290, 2006, 11 pages.

Pous et al., "Enhancing accessibility: mobile to ATM case study," http://ieeexplore.ieee.org/document/6181024/, Jan. 14, 2012, 5 pages.

Arnfield, "ATM and Mobile 101," https://www.google.com/url?sa=t&rct=j&q=&esrc=s&source=web&cd=1&ved=0ahUKEwi7-qm-9OTPAhVJ2yYKHX93BvkQFggeMAA&url=http%3A%2F%2Fnmgprod.s3.amazonaws.com%2Fmedia%2Ffiler_public%2F80%2F68%2F8068b06a-e0fc-4080-b9f1-a369e993af6a%2Fatm_mobile_101_amc_final.pdf&usg=AFQjCNH_fZMjPU_VM-er_E6LP9iT0tFpwQ&sig2=porQAvlp_kVhCTtBRDS7fg, 2015 Networld Media Group, 14 pages.

Chiraag, "Withdraw cash at an ATM not through your card but through your smartphone," Oct. 11, 2013, 2 pages.

\* cited by examiner

AUGMENTED REALITY SECURITY APPLICATIONS

BACKGROUND

Augmented reality is a technology in which a person's conception of reality can be enhanced, typically through augmented sound, video or graphics displays. The augmentation is typically implemented via various technologies, such as a headset that may be worn by the person. One or more augmented views may be presented to the person through the headset.

The augmented reality headset typically includes a wearable computer and an optical display mounted to the headset. The wearable computer may include a wireless telecommunication capability, permitting a wireless connection from the wearable computer to a server computer. Because of the wireless telecommunication capability, the augmented reality headset may be used to interact with the server computer to accomplish various tasks.

SUMMARY

Embodiments of the disclosure are directed to a method implemented on an augmented reality electronic device comprising: establishing a wireless connection between the augmented reality device and an automated teller machine (ATM); authenticating a user of the augmented reality electronic device; after the wireless connection is established and after the user is authenticated, initiating a financial transaction; receiving financial information from the ATM related to the financial transaction; and displaying the financial information on a display screen of the augmented reality electronic device.

In another aspect, a method implemented on an augmented reality electronic device comprises: synchronizing the augmented reality electronic device with a security system, the security system including a server computer; receiving an image of a person at the augmented reality electronic device, the image being obtained using a camera in the augmented reality electronic device; sending the image to the server computer; receiving information from the server computer that the person is one of interest; and displaying a message that the person is one of interest on the augmented reality electronic device.

In yet another aspect, an augmented reality electronic computing device comprises: a processing unit; and system memory, the system memory including instructions which, when executed by the processing unit, cause the augmented reality electronic computing device to: establish a wireless connection between the augmented reality device and an ATM; authenticate a user of the augmented reality electronic device; after the wireless connection is established and after the user is authenticated, initiate a financial transaction; receive financial information from the ATM related to the financial transaction; and display the financial information on a display screen of the augmented reality electronic device.

The details of one or more techniques are set forth in the accompanying drawings and the description below. Other features, objects, and advantages of these techniques will be apparent from the description, drawings, and claims.

DESCRIPTION OF THE DRAWINGS

FIG. 5 shows an example FIG. 3 shows an example system for which AR may be used to identify wanted or undesirable individuals in a retail environment.

DETAILED DESCRIPTION

The present disclosure is directed to systems and methods for using augmented reality (AR) to help conduct secure financial transactions, particularly at an automated teller machine (ATM) and for using AR in a banking or retail environment to alert security personnel of sightings of "wanted" individuals. The "wanted" individuals may be known bank or ATM robbers or may be individuals of high risk to a banking or retail organization.

In an example implementation, a user may conduct a financial transaction at an ATM machine without having financial information displayed on an ATM display screen. Instead, financial information regarding the financial transaction is displayed on a display screen of the AR device. By displaying financial information on the display screen of the AR device and not on the ATM display screen, the financial transaction may be more secure. For example, other individuals who may be near the ATM display screen, for example people waiting in line to use the ATM, are not able to see the financial information of the financial transaction. Only the user of the AR device is able to see the financial information.

In another implementation relating to identifying wanted or undesirable individuals, when a person wearing an AR device enters a bank or retail store, the AR device may synchronize with a bank security system or a retail store security system. As the person walks around in the bank or retail store, images of individuals viewed via a camera in the AR device may be sent to the bank security system or retail store security system. The images may be compared at the bank security system or retail store security system with images of wanted or undesirable individuals. When a match is found, security personnel in the bank or retail store may be alerted.

In yet another implementation, a greeter or other employee of a bank or retail store may use an AR device to identify wanted or undesirable individuals. For example, if the greeter is wearing an AR device, as the greeter greets people entering the bank or retail store, an image of the person being greeted is sent to the bank security system or retail store security system. The bank security system or retail store security system may determine, for example, that the individual is wanted for a crime such as bank robbery or that the individual has a record of stealing items from the retail store. The bank security system or retail store security system may issue an alert that may be displayed on a display screen of the AR device. The alert may inform the greeter that there is a wanted individual in the bank or retail store and may display instructions as how to proceed, for example by activating an alarm or calling 911.

The systems and methods are generally described for an AR headset that may be worn by a user. The AR headset includes a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. In addition, in some implementations, the wearable computer also includes biometric capability such as facial recognition, retinal scan capability, finger print and voice print capability. The biometric capability permits biometric authentication of the user, as described in more detail later herein.

One type of AR headset described in this disclosure is a smart glass type of headset, similar to eyeglasses, which may be worn by the user. The user may view AR images in the glass portion of the headset. An example of a smart glass headset is Google Glass, from Google Inc. of Mountain View, Calif.

The systems and methods are also described for a mobile electronic device, such as a smart telephone or laptop computer, having an AR software application. The smart telephone and laptop computer each includes a camera that may be used to view individuals in a bank or retail organization. The AR software application may permit an initiation of a financial transaction at an ATM machine using voice commands. The AR software application may also provide one or more methods of biometric authentication of the user of the mobile electronic device. In addition, financial information related to the financial transaction may be overlaid on a display screen of the mobile electronic device.

Figure 1:
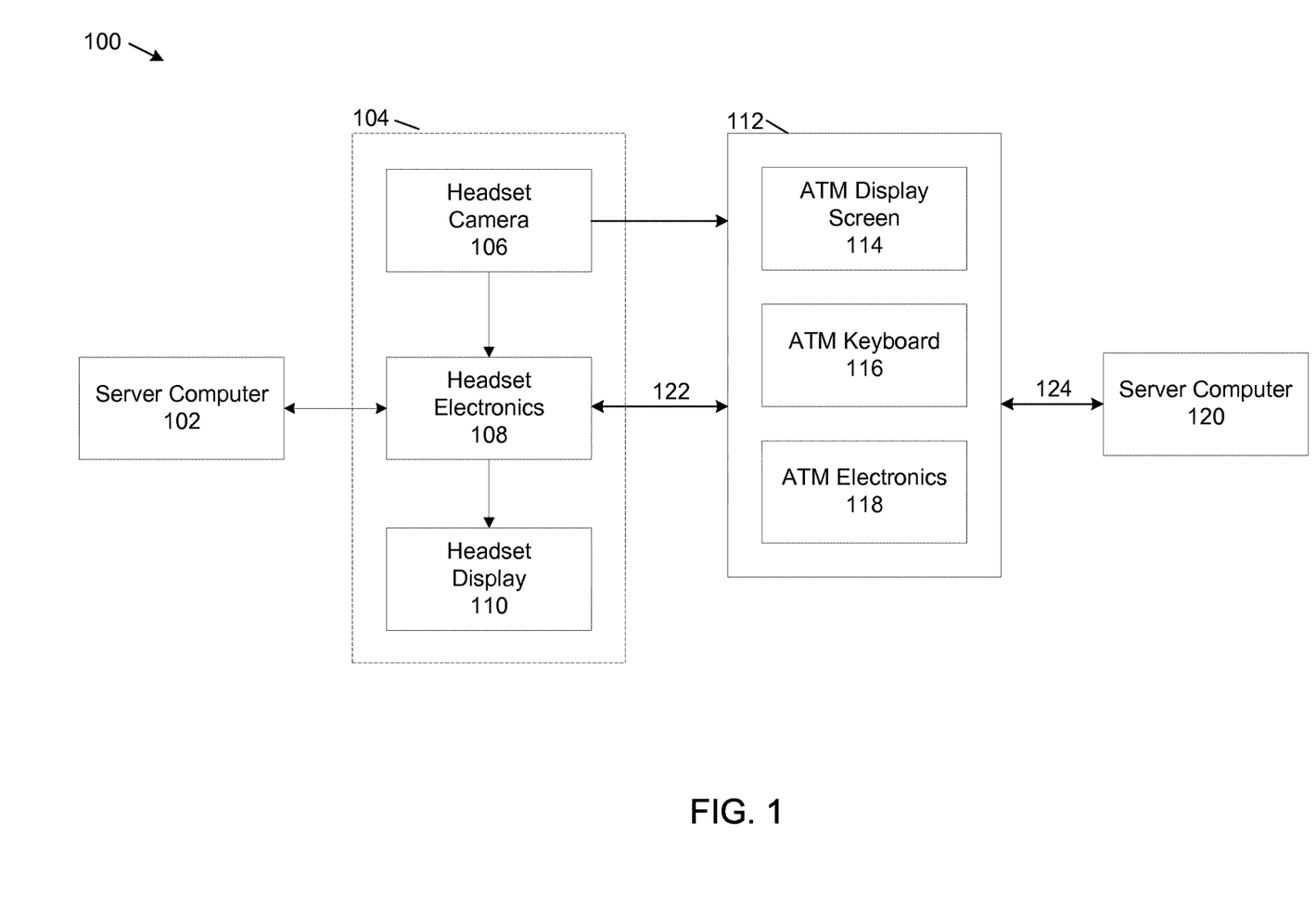
FIG. 1 shows an example system for which augmented reality (AR) may be used to enhance security applications.

FIG. 1 shows an example system 100 for which AR may be used to enhance security applications. The example system 100 includes a server computer 102, an AR headset 104, an ATM 112 and a server computer 120. The example AR headset 104 includes a headset camera 106, headset electronics 108 and a headset display 110. The ATM 112 is a typically located inside a bank or near a bank. However, the ATM may also be located elsewhere, for example in a shopping mall, an airport, etc.

The example server computer 102 is typically a server computer at a bank or banking organization. A wireless connection 122 may be established between the AR headset 104 and the server computer 102. Information may be exchanged via a wireless connection 122 between the AR headset 104 and the server computer 102. One type of information that may be exchanged between the AR headset 104 and the server computer 102 is biometric authentication information that may be used to authenticate a user of the AR headset 104, as explained in more detail later herein.

The server computer 120 is also typically a server computer at a bank or banking organization. In some implementations, server computer 102 and server computer 120 are the same server computer. In other implementations, server computer 102 and server computer 120 are different server computers. The server computer 120 is accessible from the ATM 112 and processes transactions at the ATM 112. Information relating to a financial transaction from the ATM 112 may be transmitted to server computer 120. Financial information generated by server computer 120 may be transmitted to the ATM 112 and then from the ATM 112 to AR headset 104.

The example AR headset 104 includes a headset camera 106, headset electronics 108 and a headset display 110. The example headset camera 106 is a camera that is typically mounted to the headset such that a lens of the camera has a same orientation as the user. When the user looks at an object or a scene, the camera is positioned to record or transmit what the user sees. The headset electronics 108 includes an electronic computing device with wireless capability. The wireless capability may include Bluetooth or a similar type of wireless capability. The headset electronics 108 may also include optical character recognition (OCR).

The ATM 112 includes an ATM display screen 114, an ATM keyboard 116 and ATM electronics 118. The ATM electronics 118 also includes an electronic computing device with wireless capability. The wireless capability may include Bluetooth or a similar type of wireless capability.

In an example implementation, a user wearing the AR headset 104 approaches the ATM 112. When the user comes within a predetermined distance of the ATM 112, for example several feet, a wireless connection 124 is initiated between the AR headset 104 and the ATM 112. The wireless connection may be initiated via a Bluetooth communication protocol or via a similar type of wireless communication protocol.

When the ATM 112 is not being used by another individual, the user initiates a financial transaction at the ATM 112. In some implementations, the user may initiate the financial transaction by inserting an ATM card into a card reader of the ATM 112. In this implementation, the user typically enters a personal identification number (PIN) via ATM keyboard 116. The PIN authenticates the user at the ATM 112. After the user is authenticated, the user may select a transaction, for example withdrawing money from the user's checking account, via the ATM keyboard 116. However, in this implementation, some or all messages regarding the financial transaction that may usually be displayed on the ATM display screen 114 are instead displayed on the headset display 110.

For example, financial information such as the user's account balance is displayed on headset display 110. In some implementations, the ATM display screen 114 is blank when the financial information is displayed on the headset display 110. In other implementations, the ATM display screen 114 displays other information, such as marketing information, instead of the user's financial information. In this way, only the user can see the financial information (via the headset display 110). Other people near the ATM, such as people waiting in line, are not able to see the financial information.

In another example implementation, when the ATM 112 is not being used by another individual, the user may be authenticated by a biometric authentication method such as a facial scan, retinal scan, finger print scan or voice print. When the user is authenticated by the biometric authentication method, the user no longer needs to enter a PIN via ATM keyboard 116 in order to be authenticated. However, in order to give the user a sense of security regarding use of the ATM 112, the user is typically asked to enter a security code into the ATM 112. The security code is sent from server computer 120 and displayed on headset display 110 after the user is authenticated. In this implementation, after the user enters the displayed security code into ATM 112 and the security code is validated at the server computer 120, the user is enabled to initiate a financial transaction. For example, a list of available financial transactions may be displayed on the headset display 110. In addition, because this implementation uses biometric authentication and a security code, an actual ATM card may not need to be used.

In some situations, a user may approach the ATM 112 and find that the ATM is currently being used by another person. In some situations, there may also be a line of people waiting ahead of the user. In these situations, when the user is wearing the AR headset 104 and the user is within the predetermined distance to the ATM 112, the wireless connection 124 may still be established between the AR headset 104 and server computer 120. The user may be still be authenticated using a biometric authentication method and a security code may still be displayed on the headset display 110 of the user, but the user is not able to complete an execution of a financial transaction at the ATM 112. In some implementations, the user may be able to utter the security code to fully authenticate the user. Once the user is fully authenticated, the user may be able to initiate, but not fully execute financial transactions. Instead, the user may be able to initiate one or more transactions and have the transactions queued at the server computer 120 until such time as the ATM 112 becomes available. In this way, the user can complete the transactions faster at the ATM 112 when the ATM 112 becomes available.

Figure 2:
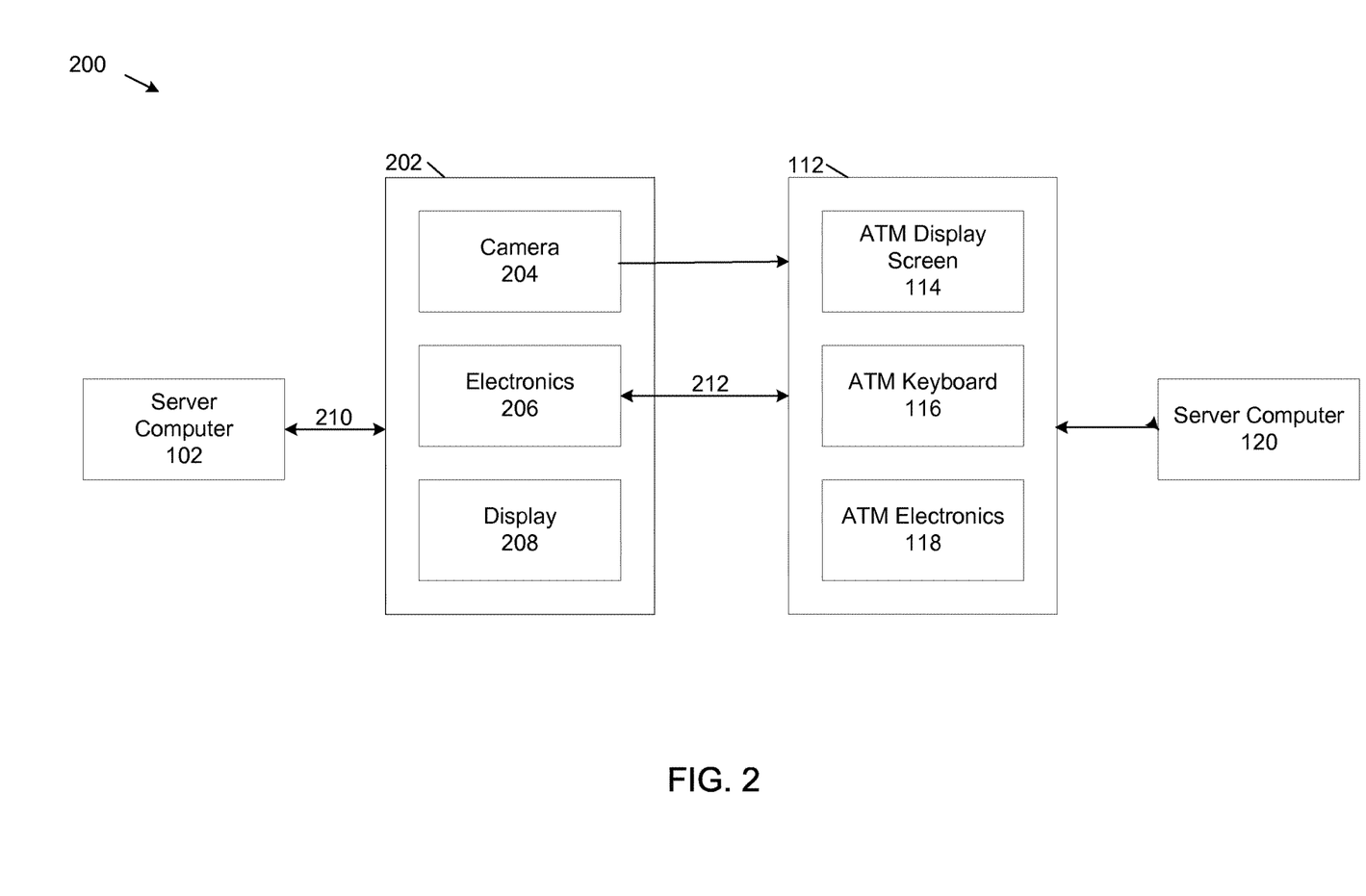
FIG. 2 shows another example system for which AR may be used to enhance security applications.

FIG. 2 shows another example system 200 for which AR may be used to enhance security applications. For the example system 200, a mobile electronic computing device with an AR software application is used instead of an AR device. The mobile electronic device is typically a smart telephone or a tablet computer.

The example system 200 includes server computer 102, mobile electronic device 202, ATM 112 and server computer 120. The mobile electronic device 202 is typically a smart telephone or a tablet computer. The mobile electronic device 202 includes camera 204, electronics 206 and display 208. The electronics 206 includes an electronic computing device with wireless capability. The wireless capability may include Bluetooth or a similar type of wireless capability.

In system 200, a wireless connection 210 may be established between the mobile electronic device 202 and server computer 102. Another wireless connection 212 may be established between the mobile electronic device 202 and the ATM 112. The wireless connection 210 may be used to authenticate the user of the AR headset via a biometric authentication method. The wireless connection 212 may be used to transmit financial transaction information between the mobile electronic device 202 and the ATM 112.

In an example implementation using system 200, when a user with mobile electronic device 202 comes within a predetermined distance from the ATM 112 and the user has initiated a mobile banking application on the mobile electronic device 202, the wireless connection 212 is established between the mobile electronic device 202 and the ATM 112.

At some point either before the wireless connection 212 is fully established or after the wireless connection 212 is established, the user is authenticated. In some implementations the user is authenticated via a biometric authentication method. In these implementations biometric authentication typically is achieved via sending biometric information to server computer 102 and obtaining an indication of biometric authentication from server computer 102. The biometric information may be obtained, for example, by using the camera 204 to focus on the face of the user. A facial scan or retinal scan may then be performed on the image of the face using an AR software application on the mobile electronic device 202. Server computer 102 compares information regarding the facial scan or retinal scan with facial and retinal information previous stored on server computer 102 or accessible from server computer 102. When a match occurs, server computer 102 generates an indication of biometric authentication.

The indication of biometric authentication is then sent to server computer 120 via wireless connection 212 and ATM 112. In some implementations, biometric authentication may be performed via server computer 120 instead of via server computer 102. In other implementations, authentication is implemented by the user entering a PIN into ATM 112.

When server computer 120 receives the financial transaction information from the ATM 112, server computer 120 processes the transaction. Server computer 120 may then send additional financial information related to the financial transaction to ATM 112. The additional financial information may include such items as a confirmation number for the transaction, an account balance, etc. In the example implementation using system 200, when ATM 112 receives the additional financial information, ATM 112 sends the additional financial information via wireless connection 212 to mobile electronic device 202. The additional financial information is displayed on display 208 instead of on ATM display screen 114.

Figure 3:
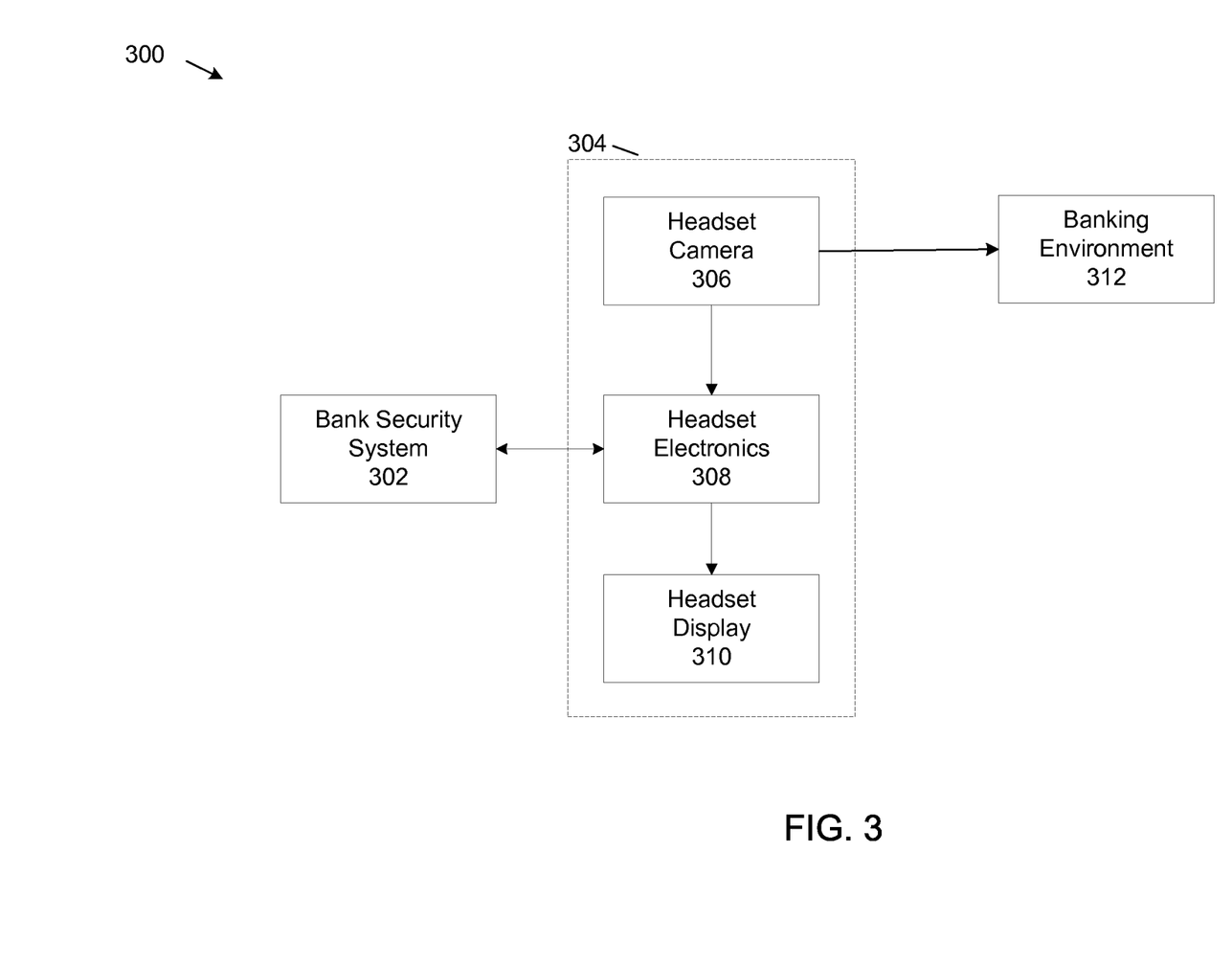
FIG. 3 shows an example system for which AR may be used to identify wanted or undesirable individuals in a bank.

FIG. 3 shows an example system 300 for which AR may be used to identify wanted or undesirable individuals in a bank. The system 300 may also be used in a retail store in addition to a bank.

The example system 300 includes a bank security system 302, an AR headset 304 and banking environment 312. The bank security system 302 comprises one or more electronic devices in the bank or accessible from the bank. The electronic devices may include one or more computing devices including server computers. The AR headset 304 includes a headset camera 306, headset electronics 308 and a headset display 310. The banking environment 312 includes individuals that may be in a particular bank. The individuals may include banking customers, bank employees and any other people that may be in the bank.

When a customer wearing the AR headset 304 enters the bank, the AR headset 304 is synchronized with the bank security system 302. When the customer moves around the bank, the headset camera 306 sends images of what the customer sees to the bank security system 302. The bank security system 302 compares the images to stored images of known wanted or undesirable people. For example, the wanted or undesirable people may include known criminals, including bank robbers, people otherwise wanted by law enforcement organizations, people with a history of causing problems at the bank or other locations, etc. The images may be stored at the bank security system 302 or on a data store accessible from the bank security system 302.

When a determination is made at the bank security system 302 that an undesirable person is in the bank, the bank security system may send an alert to the AR headset 304. The alert is displayed on headset display 310.

Figure 4:
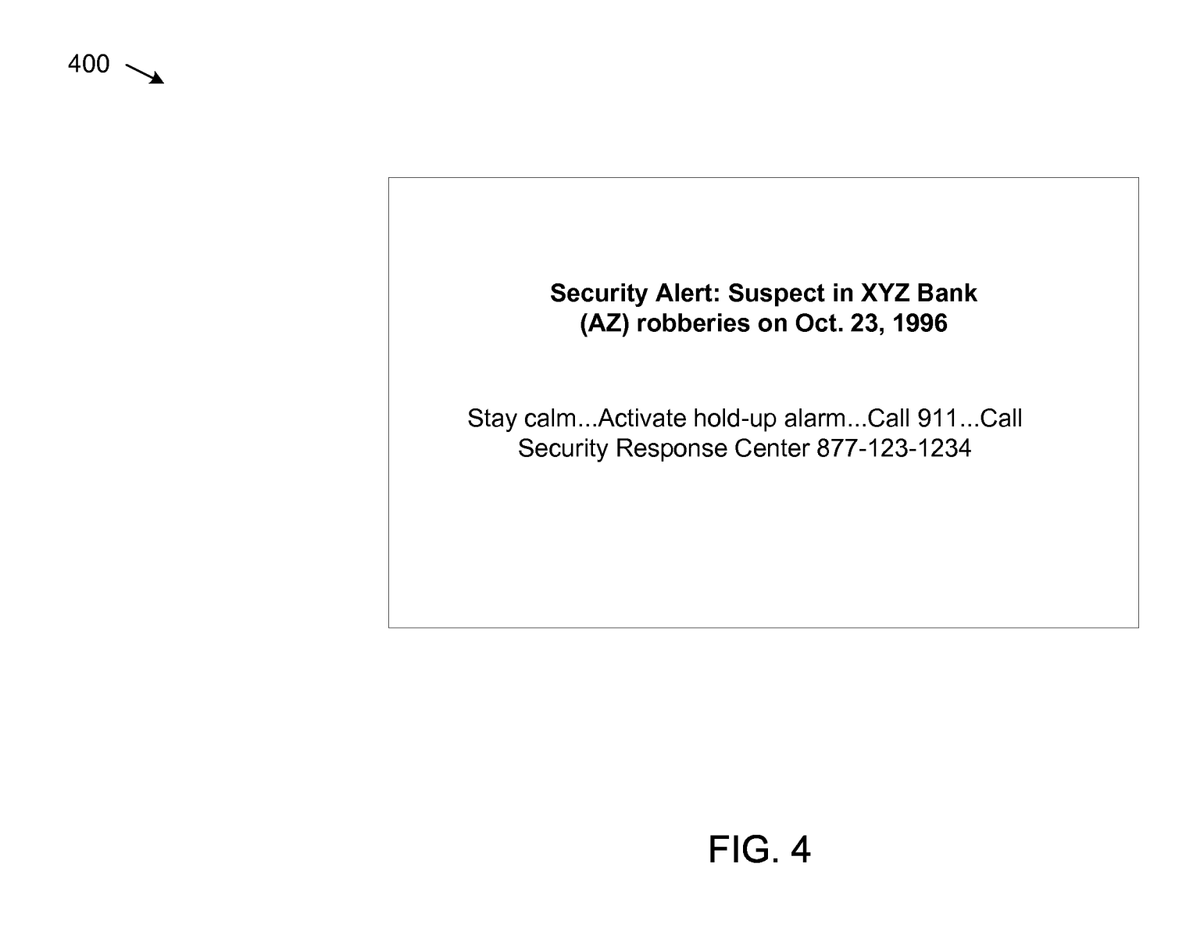
FIG. 4 shows an alert that may be displayed on the AR headset of FIG. 1.

FIG. 4 shows an example alert 400 that may be displayed on AR headset 304. The alert 400 indicates that there is a suspect in the XYZ Bank and that the suspect committed robberies on Oct. 23, 1996. The alert also displays example instructions for the user of the AR headset 304. As shown in FIG. 4, the user is instructed to stay calm, activate a hold-up alarm, call 911 and call a security response center. Other example alerts are possible.

Figure 5:
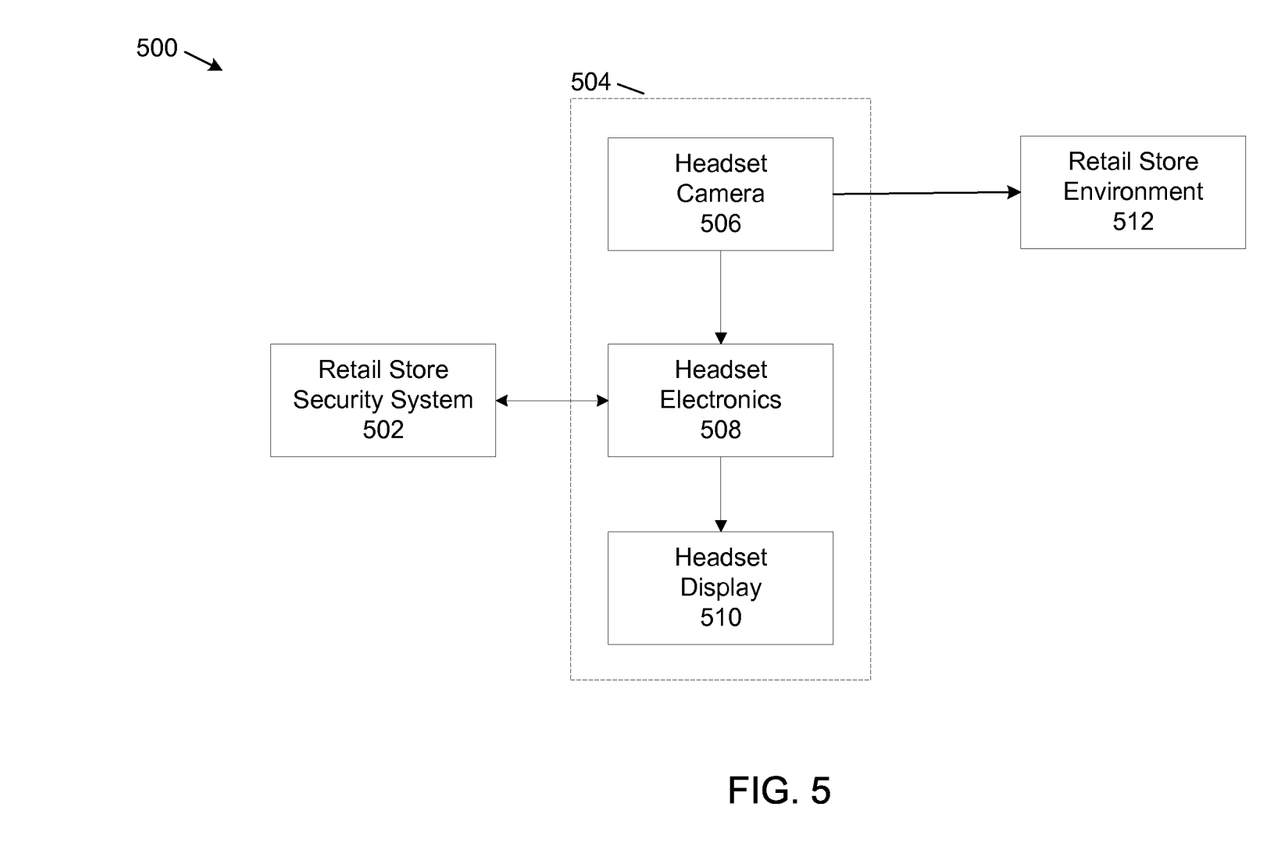

FIG. 5 shows a system 500, similar to system 300 that may be used in a retail environment instead of in a bank. The system 500 includes a retail store security system 502 instead of bank security system 302 and a retail environment 512 instead of the banking environment 312. For example, a customer wearing AR headset 504 in a retail store may send images of people in the retail store to the retail store security system 502. The retail store security system 502 compares the images to images of known wanted persons stored at the security system. When a match occurs, the retail store security system sends an alert to the customer's AR headset 504. The retail store security system may take other action, such as notifying retail store security personnel or notifying law enforcement.

The system 500 may also be used by a greeter in a retail store to issue security alerts. For example, the greeter may wear AR headset 504. When the greeter greets an individual entering the retail store, camera 506 of the AR headset 504 may scan the face of the individual. The scanned image of the individual's face may then be sent to the retail store security system 502. The retail store security system 502 compares the image with stored images of known wanted persons or persons that the retail store considers as undesirable. For example, an undesirable person may be a person having a history of disruptive behavior in the retail store, including such behaviors as theft of merchandise and rowdiness.

When the retail store security system 502 determines that a wanted or undesirable person is in the retail store, the retail store security system may issue an alert. The alert may be displayed on the headset display 510 of the AR headset 504 to alert the greeter that there is a wanted or undesirable person in the retail store. The alert may also be sent to retail store security personnel and law enforcement.

Figure 6:
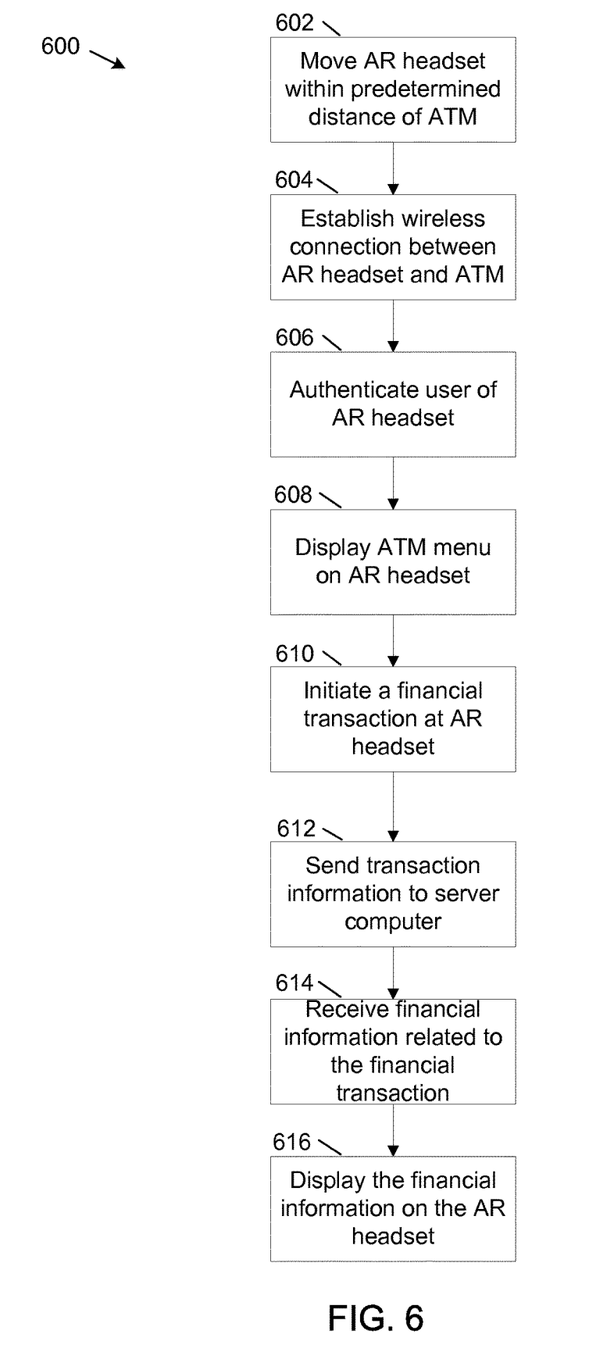
FIG. 6 shows a flowchart for an example method for displaying automatic teller machine (ATM) information on the AR headset of FIG. 1.

FIG. 6 shows a flowchart of a method 600 for displaying ATM transaction information on an AR headset. The AR headset 104 is used for this method.

At operation 602, the AR headset 104 is moved to a close proximity of an ATM, in this method ATM 112. Moving the AR headset 104 to close proximity of ATM 112 comprises moving the AR headset 104 to within a predetermined distance of ATM 112. The predetermined distance is a distance close enough so that a Bluetooth communication protocol is activated on the AR headset 104 and on the ATM 112. In method 600, the predetermined distance is 10 feet, although in other implementations a range of up to about 10 meters (about 32 feet) may be used.

At operation 604, a wireless connection is established between the AR headset 104 and the ATM 112. For method 600, a Bluetooth connection is established. Because the ATM 112 has a connection to a server computer, for example server computer 120, once the wireless connection is established between AR headset 104 and ATM 112, information can be transmitted between AR headset 104 and server computer 120.

At operation 606, the user of AR headset 104 is authenticated. In the example method 600, the authentication is implemented by a biometric authentication method such as facial recognition, retinal scan, finger print scan or voice print. In other methods, a manual authentication method such as a PIN may be used. For the method 600, the authentication is implemented via a wireless connection between AR headset 104 and server computer 102. In this implementation, server computer 102 includes AR software that permits biometric authentication. In this implementation, server computer 120 is dedicated to serving one or more ATM machines and does not include support biometric authentication.

At operation 608, a menu of ATM choices is displayed on the AR headset. The menu of ATM choices is similar to a menu that may be displayed on the ATM display screen 114. For example, the menu may display choices such as receive cash or make a deposit, etc.

At operation 610, a financial transaction is initiated at the AR headset. The financial transaction is typically a common ATM transaction such as receiving cash or depositing a check. The transaction may be initiated by selecting from the menu of choices displayed on the AR headset or by uttering the name of a transaction item—such as "receive cash" or "deposit check." In other implementations, the user may use a keypad on the ATM 112 to initiate the financial transaction.

At operation 612, the transaction information is sent to server computer 120. For example, if the user decides to receive cash in an amount of $100, a message containing information related to a cash withdrawal of $100 from the user's checking account is sent to server computer 120. When the user initiates the financial transaction from the AR headset 104, the information is sent from the AR headset 104 via the Bluetooth connection to the ATM 112 and then from ATM 112 to server computer 120. When the financial transaction is initiated from the ATM 112, the information is sent from ATM 112 to server computer 120.

At operation 614, financial information related to the financial transaction is received at the AR headset 104. The financial information is sent by server computer 120, received at ATM 112 and sent via the Bluetooth connection to ATM 112. The financial information may include such items as a confirmation that the financial transaction has been completed, an account balance, a receipt, etc. Other types of financial information are possible.

At operation 616, the financial information is displayed on headset display 110 of the AR headset 104.

Figure 7:
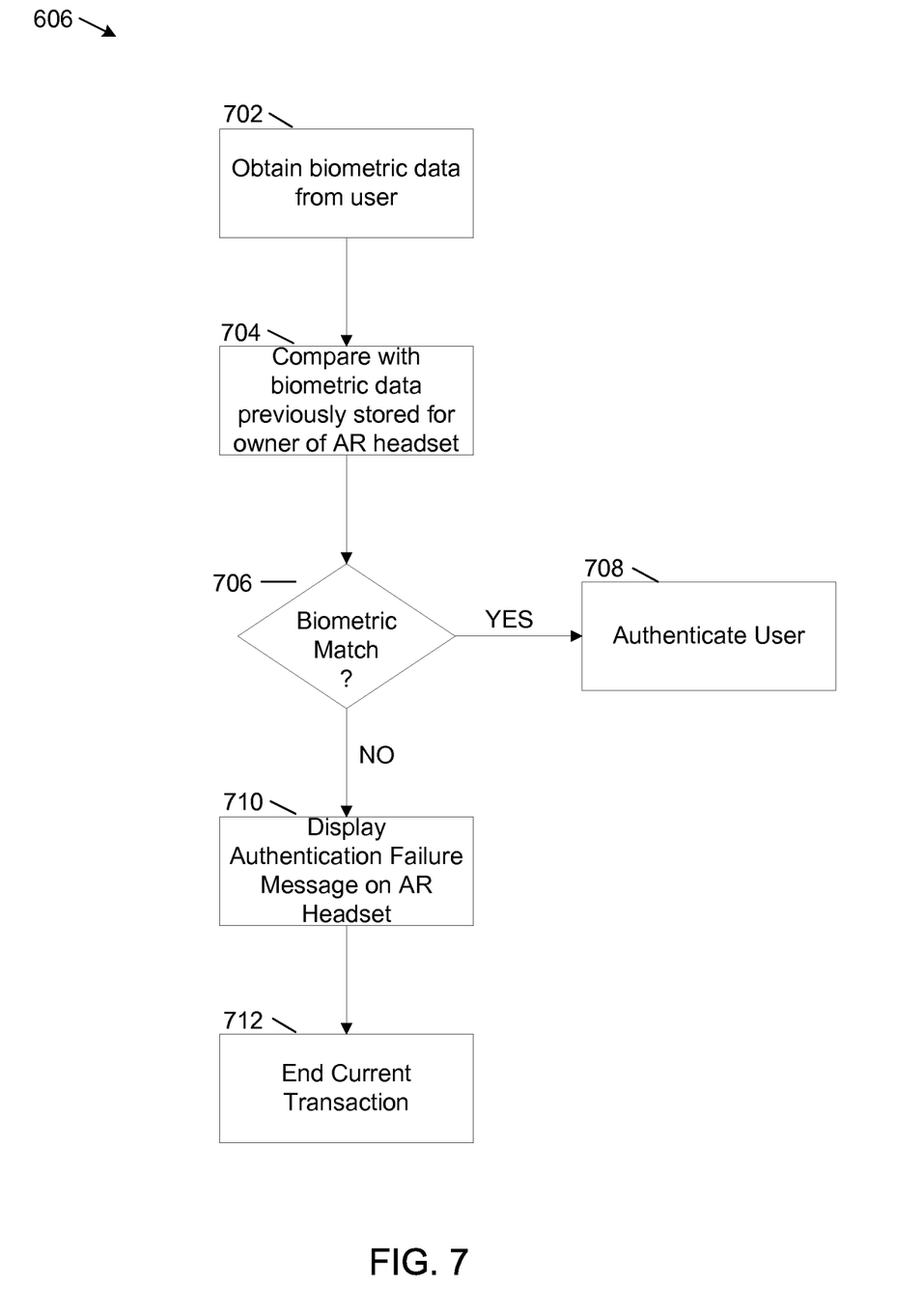
FIG. 7 shows a flowchart of an example method for authenticating a user.

FIG. 7 shows a flowchart of a method for the operation 606 for authenticating the user. At operation 702, biometric information is obtained from the user. Typically, the biometric information is obtained from one of facial recognition, retinal scan, voice print or finger print scan. Facial recognition comprises scanning the user's face with the headset camera 106 and extracting specific facial features from the scanned image of the user's face. Retinal scan uses unique patterns on the user's iris in order to identify the user. Voice print obtains a spectrogram of the user's voice, for example when the user utters a command. Finger print scan uses finger print recognition to identify the user. In some implementations, finger print recognition hardware and software are built into the AR device. For example, when the user touches the headset display 110, the user's finger print may be scanned.

At operation 704, the biometric information for the user obtained at operation 702 is compared with previously obtained biometric information for the user. Typically, when the user is assigned an AR device, a biometric profile is compiled for the user and stored on the AR device. The profile may include one or more of a facial profile, a retinal profile, a voice print and a finger print.

At operation 706, a determination is made as to whether the biometric information obtained at operation 702 matches the previously obtained biometric information for the user. When a determination is made that there is a match, at operation 1008, the user is designated as being authenticated.

When a determination is made that there is not a match, at operation 710, a message is displayed on the headset display 110 indicating that there is an authentication failure.

Figure 8:
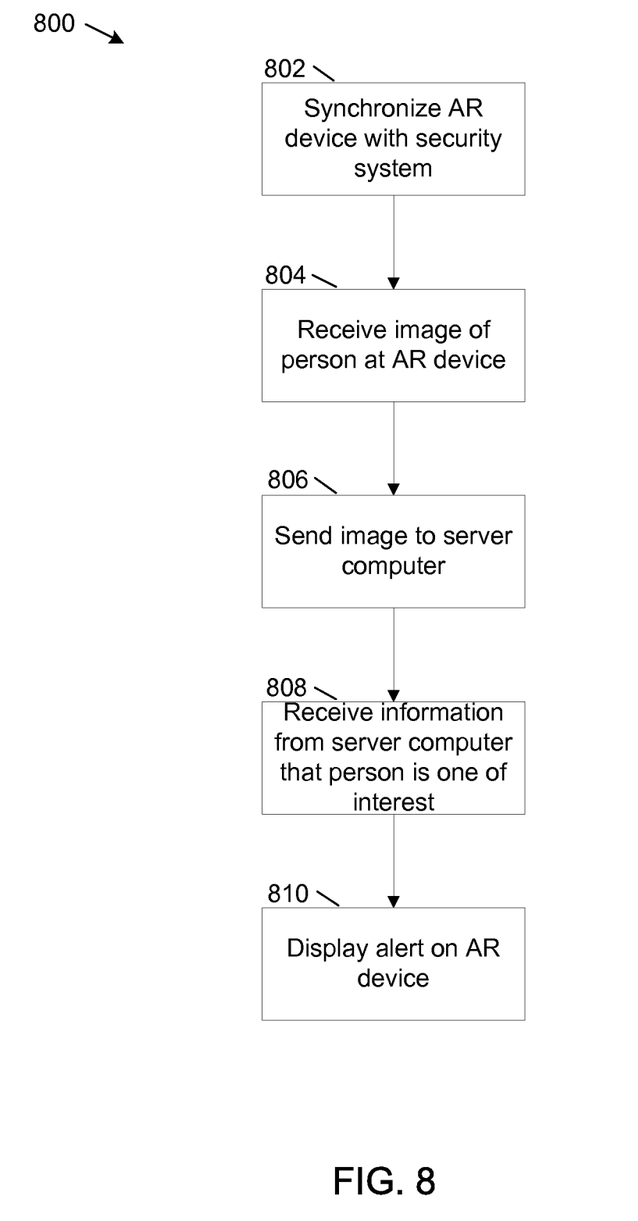
FIG. 8 shows a flowchart of an example method for displaying a security alert on the AR device of FIG. 1.

FIG. 8 shows a flowchart of a method 800 for displaying a security alert on an AR device. For this method, the AR device is the AR headset 104. The method 800 may apply to a variety of environments, including a banking environment and a retail environment.

In method 800, a user who is wearing the AR headset 104 is in an environment such as a bank or retail store with customers of the bank or retail store. The bank or retail store has a security system, such as bank security system 302 or retail store security system 502. At operation 802, the AR device is synchronized with the bank security system 302, the retail store security system 502 or another security system, as the case may be.

The user may be a customer or employee at a bank, a greeter in a retail store, an employee at the retail store, etc. As the user walks around the bank or retail store, headset camera 106 scans images of people in the bank or retail store with whom the user comes in contact. At operation 804, the user receives a scanned image of a person at the AR headset 104.

At operation 806, the image is sent to a server computer, for example server computer 102. Server computer 102 is a server computer, typically at a financial institution or retail business. The AR headset has access to server computer 102 via a wireless connection.

At operation 808, information is received from the server computer 102 that the person whose image was sent to server computer 102 is a person of interest. The person of interest is typically a person that is wanted by the bank or retail institution or one who is considered undesirable by the bank or retail institution. For example, the person may be a known criminal, such as a bank robber or a person that has previously caused a problem at the retail institution. The server computer 102 determines that the person is one of interest by comparing the scanned image of the person with images of people who are wanted or undesirable. The images being compared are typically compiled by the bank, the retail store or law enforcement agencies.

At operation 810, an alert is displayed on the AR headset 104. The alert informs the user that the person is a person of interest and typically provides a message as to why the person may be wanted by the bank or retail institution. The alert may also provide instructions to the user, such as remain calm, call 911, etc.

Figure 9:
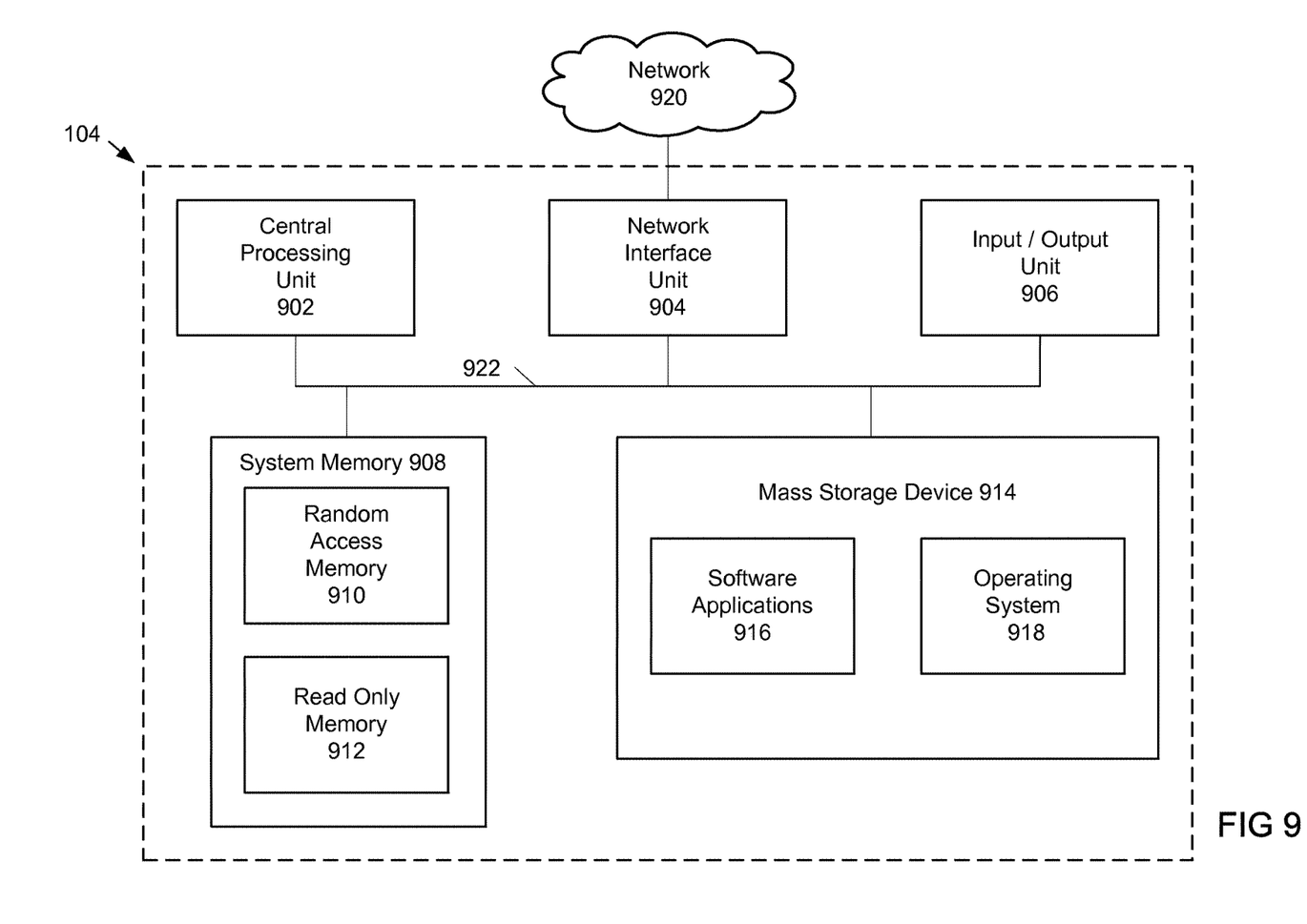
FIG. 9 shows example physical components of the AR headset of FIG. 1.

As illustrated in the example of FIG. 9, the AR headset 104 includes at least one central processing unit ("CPU") 902, a system memory 908, and a system bus 922 that couples the system memory 908 to the CPU 902. The system memory 908 includes a random access memory ("RAM") 910 and a read-only memory ("ROM") 912. A basic input/output system that contains the basic routines that help to transfer information between elements within the AR headset 104, such as during startup, is stored in the ROM 912. The AR headset 104 further includes a mass storage device 914. The mass storage device 914 is able to store software instructions and data. A central processing unit, system memory and mass storage device similar to that in FIG. 9 are also included in server computer 102.

The mass storage device 914 is connected to the CPU 902 through a mass storage controller (not shown) connected to the system bus 922. The mass storage device 914 and its associated computer-readable data storage media provide non-volatile, non-transitory storage for the AR headset 104. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 102.

According to various embodiments of the invention, the AR headset 104 may operate in a networked environment using logical connections to remote network devices through the network 920, such as a wireless network, the Internet, or another type of network. The AR headset 104 may connect to the network 920 through a network interface unit 904 connected to the system bus 922. It should be appreciated that the network interface unit 1404 may also be utilized to connect to other types of networks and remote computing systems. The AR headset 104 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the AR headset 104 can store software instructions and data. The software instructions include an operating system 918 suitable for controlling the operation of the AR headset 104. The mass storage device 914 and/or the RAM 910 also store software instructions, that when executed by the CPU 902, cause the AR headset 104 to provide the functionality of the AR headset 104 discussed in this document. For example, the mass storage device 914 and/or the RAM 910 can store software instructions that, when executed by the CPU 902, cause the AR headset 104 to display received financial data on the display screen of the AR headset 104.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an augmented reality electronic device, the method comprising:
   establishing a wireless connection between the augmented reality electronic device of a user and an automated teller machine (ATM) having a display screen, the wireless connection being established when the user comes within a predetermined distance of the ATM;
   using the augmented reality electronic device, authenticating the user of the augmented reality electronic device, the augmented reality electronic device being a headset comprising a wearable computer and an optical head-mounted display;
   after the wireless connection is established and after the user is authenticated;

when the ATM is not being used, completing one or more financial transactions at the ATM for the first user; and when the ATM is being used by another user:
using the augmented reality electronic device, sending the one or more financial transactions for the user for queueing at a server computer; and
when the ATM is no longer being used, using the augmented reality electronic device, fully executing the one or more financial transactions queued at the server computer at the ATM for the user;

receiving financial information from the ATM related to the one or more financial transactions;

while the wireless connection is established between the augmented reality electronic device of the user and the ATM and the one or more financial transactions are executed at the ATM, displaying non-personal information on the ATM display screen and concurrently displaying personal financial information for the user on the optical head-mounted display of the augmented reality electronic device, the personal financial information for the user not being displayed on the ATM display screen, wherein the augmented reality electronic device used to authenticate the user is the same augmented reality electronic device on which the financial information is displayed.

2. The method of claim 1, wherein the authentication is performed using a biometric method of authentication.

3. The method of claim 2, wherein the biometric method is one of a facial scan, retinal scan, finger print scan or voice print.

4. The method of claim 1, further comprising displaying a menu of transaction choices on the augmented reality electronic device.

5. The method of claim 4, wherein the menu of transaction choices is received from the ATM via the wireless connection.

6. The method of claim 1, wherein the financial transaction is initiated from the augmented reality electronic device.

7. The method of claim 6, wherein initiating the financial transaction comprises uttering a name for a category of financial transaction.

8. The method of claim 1, wherein the financial transaction is initiated without the use of an ATM card.

9. The method of claim 1, wherein advertising, marketing or account information is displayed on the augmented reality electronic device when the one or more financial transactions are queued.

10. An augmented reality electronic computing device comprising:
a headset comprising a wearable computer and an optical head-mounted display;
a processing unit; and
system memory, the system memory including instructions which, when executed by the processing unit, cause the augmented reality electronic computing device to:
establish a wireless connection between the augmented reality electronic computing device and an automated teller machine (ATM) when a first user of the augmented reality electronic computing device comes within a predetermined distance of the ATM;
authenticate the user of the augmented reality electronic computing device;
after the wireless connection is established and after the first user is authenticated;
when the ATM is not being used, complete one or more financial transactions at the ATM for the first user;
when the ATM is being used by a second user:
send the one or more financial transactions for the first user for queuing at a server computer without fully executing the one or more financial transactions; and
when the ATM is no longer being used by the second user, fully execute at the ATM the one or more financial transactions that are queued at the server computer for the first user;
receive financial information from the ATM related to the one or more financial transactions; and
while the wireless connection is established between the augmented reality electronic computing device and the ATM, display information on the optical head-mounted display of the augmented reality electronic computing device and concurrently display a financial account balance for the user on the ATM.

11. The augmented reality electronic computing device of claim 10, wherein the user is authenticated by a biometric authentication method.

* * * * *

UNITED STATES PATENT AND TRADEMARK OFFICE
CERTIFICATE OF CORRECTION

PATENT NO. : 9,792,594 B1
APPLICATION NO. : 14/151974
DATED : October 17, 2017
INVENTOR(S) : Bayha et al.

Page 1 of 1

It is certified that error appears in the above-identified patent and that said Letters Patent is hereby corrected as shown below:

Column 10, Line 67: Claim 1, Line 9:
"authenticated;" should read --authenticated:--.

Column 12, Line 22: Claim 10, Line 11:
"authenticated;" should read --authenticated:--.

Signed and Sealed this
Thirty-first Day of July, 2018

Andrei Iancu
*Director of the United States Patent and Trademark Office*